United States Patent
Tan et al.

(10) Patent No.: US 12,360,915 B2
(45) Date of Patent: Jul. 15, 2025

(54) OPERATION METHOD OF CONTROLLER, CONTROLLER, AND MEMORY SYSTEM

(71) Applicant: Yangtze Memory Technologies Co., Ltd., Hubei (CN)

(72) Inventors: Guangtao Tan, Wuhan (CN); Jiangwei Shi, Wuhan (CN); Shengfei Yu, Wuhan (CN)

(73) Assignee: Yangtze Memory Technologies Co., Ltd., Hubei (CN)

( * ) Notice: Subject to any disclaimer, the term of this patent is extended or adjusted under 35 U.S.C. 154(b) by 0 days.

(21) Appl. No.: 18/442,031

(22) Filed: Feb. 14, 2024

(65) Prior Publication Data
US 2025/0117335 A1    Apr. 10, 2025

(30) Foreign Application Priority Data
Oct. 9, 2023    (CN) .......................... 202311306931.X (51) Int. Cl.
*G06F 12/1009*    (2016.01)
(52) U.S. Cl.
CPC .................. *G06F 12/1009* (2013.01)
(58) Field of Classification Search
None
See application file for complete search history.

(56) References Cited

U.S. PATENT DOCUMENTS

| | | | | |
|---|---|---|---|---|
| 2019/0087348 A1* | 3/2019 | Liao | ................... | G06F 12/0891 |
| 2020/0310983 A1* | 10/2020 | Byun | ................... | G06F 12/0253 |
| 2021/0200670 A1* | 7/2021 | Winterfeld | .......... | G06F 11/3058 |
| 2023/0305712 A1* | 9/2023 | Kang | ................... | G06F 11/0751 |
| 2024/0361957 A1* | 10/2024 | Hahn | ..................... | G06F 3/061 |
| 2025/0068336 A1* | 2/2025 | Lee | ....................... | G06F 3/0679 |

\* cited by examiner

*Primary Examiner* — Edward J Dudek, Jr.
*Assistant Examiner* — Ralph A Verderamo, III
(74) *Attorney, Agent, or Firm* — Fish & Richardson P.C.

(57) ABSTRACT

In an example operation method of a controller, a mapping relationship of translation from a first physical block address into a first logical block address is written to a first entry according to a write instruction. The first physical block address is a storage address in a memory, and the first logical block address is a storage address recorded in the write instruction. Storage data is written to the first physical block address. A mapping relationship of translation from the first logical block address into the first physical block address is written to a second entry. When a product of first time and second time is greater than or equal to a first value, the second entry is updated into the memory, wherein the first time is theoretical time for refreshing the first entry, and the second time is theoretical time for refreshing the second entry.

20 Claims, 4 Drawing Sheets

| | Index | Physical block address | Logical block address |
|---|---|---|---|
| Group 1 | 1 | 1-PBA1 | |
| | ... | ... | |
| | s | 1-PBAs | |
| Group 2 | 1 | 2-PBA1 | |
| | ... | ... | |
| | s | 2-PBAs | |
| | ... | | |
| Group h | 1 | h-PBA1 | |
| | ... | ... | |
| | s | h-PBAs | |

OPERATION METHOD OF CONTROLLER, CONTROLLER, AND MEMORY SYSTEM

CROSS-REFERENCE TO RELATED APPLICATIONS

This application claims priority to Chinese Patent Application No. 202311306931.X, filed on Oct. 9, 2023, which is hereby incorporated by reference in its entirety.

TECHNICAL FIELD

The present disclosure relates to the technical field of data storage, and particularly to an operation method of a controller, a controller, and a memory system.

BACKGROUND

A host and a memory system are disposed in an electronic apparatus. The memory system comprises a controller and a memory. The memory is configured to store some data required for the host to run. To ensure the security and reliability of data running, the host runs based on a logical block address. The memory stores data based on a physical block address. When needing to perform data processing on the memory, the host needs to perform translation between a logical block address and a physical block address and perform a corresponding data processing operation based on the assistance of the controller. To ensure the accuracy of each data processing operation to meet normal running of the host, a mapping table for a logical to physical translation, that is, a L2P table, needs to be established. A size of the L2P table is related to a storage space of the memory. An example in which a storage capacity of the memory is 1 TB is used. The size of the L2P table may reach approximately 1 GB. Therefore, when a complete L2P table is stored in a memory space or a buffer space carried in the controller, running of the controller is affected. Generally, the complete L2P table is stored in the memory.

During actual application, when write modes of a data write operation based on the controller are different, data recording modes of the L2P table are different. Update time of the L2P table in different write modes varies greatly. In prior art, a fixed threshold or condition is used to determine the time of triggering an update. This update mode has poor flexibility. In a case of random write, the update speed of the L2P tables is slow, and the data processing performance of the memory system is affected.

SUMMARY

Examples of the present disclosure provide an operation method of a controller, a controller, and a memory system, to achieve that high efficiency, low latency, and high reliability of L2P table update can be ensured in different write modes.

In order to achieve the above purpose, the examples of the present disclosure employ the following technical solution.

In a first aspect, examples of the present disclosure provide an operation method of a controller. The method comprises: acquiring a first entry; writing first mapping data to the first entry according to a write instruction, wherein the first mapping data is to indicate a mapping relationship of translation from a first physical block address into a first logical block address, the first physical block address is a storage address in a memory, and the first logical block address is a storage address recorded in the write instruction; writing storage data into the first physical block address according to the first mapping data; acquiring a second entry and writing second mapping data to the second entry, wherein the second mapping data is to indicate a mapping relationship of translation from the first logical block address into the first physical block address; and when a product of first time and second time is greater than or equal to a first value, updating the second entry into the memory, wherein the first time is theoretical time for refreshing mapping data in the first entry, and the second time is theoretical time for refreshing mapping data in the second entry.

In an example of the present disclosure, the first entry is an entry acquired from a P2L table of the memory. The second entry is an entry acquired from an L2P table of the memory. When a write mode is completely sequential write, the first mapping data in the first entry is also sequentially recorded. In this case, the first mapping data in the first entry is located in one or two groups, and then the second mapping data that needs to be updated in the second entry is also concentrated in one or two groups. A time of updating the L2P table may be considered equivalent to the first time required for refreshing the first entry. When the write mode is completely random write, the second mapping data that needs to be updated in the second entry is located in a plurality of different groups, and then the time of updating the L2P table is the second time for refreshing all groups in the second entry. The above-mentioned dynamic condition is obtained according to the first time and the second time. In different application scenarios, randomly written storage data and sequentially written storage data have different data amounts, and then triggering timing of the dynamic condition is also dynamically matched. The flexibility of triggering update of the L2P table can be improved according to the above-mentioned dynamic condition. In a case of complete random write, a case of completely sequential write, and a case of mix-using sequential write and random write, good update efficiency can be achieved, so that it is avoided that high update efficiency, low update latency, and security and reliability of updating data cannot be ensured for the update of the L2P table in different write modes under a single threshold condition or determination condition.

In some possible implementations, a value of the first time is equal to a product of a first coefficient and a first ratio, the first coefficient is a constant, and the first ratio is a ratio of the total number of addresses that need to be refreshed in the first entry to the number of addresses that can be refreshed a single time of the first entry. In an example of the present application, when sequential write is completely used, the first entry records a mapping relationship between a physical block address and a logical block address according to an address sequence. In this case, address data in the first entry is concentrated in one or two groups. Only one or two groups need to be updated. In the second entry, data that needs to be updated is also concentrated in one or two groups. Therefore, in the case of completely sequential write, a time of updating the second entry may be approximately considered as refresh time of all addresses that need to be updated, that is, a total refresh time of addresses recorded in the first entry. A total update round speed of addresses of the first entry is the total number of addresses divided by the number of addresses that can be updated a single time, that is, the first ratio. Update time of each round is the first coefficient. The first coefficient is a time determined according to actual hardware parameters. Therefore, the first time is the first ratio multiplied by the update time of a single round, that is, the first coefficient.

In some possible implementations, a value of the first time is equal to a product of a first coefficient and a first sum, the first coefficient is a constant, the first sum is a first ratio plus one, and the first ratio is a ratio of the total number of addresses that need to be refreshed in the first entry to the number of addresses that can be refreshed a single time of the first entry. In an example of the present disclosure, the first time is increased by the value of one first coefficient, so that processing of a decimal part of the first ratio by the controller can be avoided, to reduce a processing amount.

In some possible implementations, a value of the second time is equal to a product of a second coefficient and a second ratio, the second coefficient is a constant, and the second ratio is a ratio of the total number of groups that need to be updated in the second entry to the number of groups that can be refreshed a single time. In an example of the present disclosure, when random write is completely used, there are a large number of groups in the second entry. The L2P table is updated with a group as a unit. Therefore, in this case, the second ratio (that is, the total number of groups that need to be refreshed divided by the number of groups that can be refreshed a single time) represents a required round speed of refreshing, and the second coefficient represents a time required for a single round of refreshing. The product of the second ratio and the second coefficient is the second time.

In some possible implementations, a value of the second time is equal to a product of a second coefficient and a second sum, the second coefficient is a constant, the second sum is a second ratio plus one, and the second ratio is a ratio of the total number of groups that need to be updated in the second entry to the number of groups that can be refreshed a single time. In an implementation of the present disclosure, the first time is increased by the value of one first coefficient, so that processing of a decimal part of the first ratio by the controller can be avoided, to reduce a processing amount.

In some possible implementations, the first entry is greater than 16 Kb. In an example of the present disclosure, a size of the first entry is increased, so that this solution can achieve better use effect.

In a second aspect, examples of the present disclosure further provide a controller. The controller is configured to: acquire a first entry; write first mapping data to the first entry according to a write instruction, wherein the first mapping data is to indicate a mapping relationship of translation from a first physical block address into a first logical block address, the first physical block address is a storage address in a memory, and the first logical block address is a storage address recorded in the write instruction; write storage data to the first physical block address according to the first mapping data; acquire a second entry and write second mapping data to the second entry, wherein the second mapping data is to indicate a mapping relationship of translation from the first logical block address into the first physical block address; and when a product of first time and second time is greater than or equal to a first value, update the second entry into the memory, wherein the first time is theoretical time for refreshing mapping data in the first entry, and the second time is theoretical time for refreshing mapping data in the second entry.

In some possible implementations, a value of the first time is equal to a product of a first coefficient and a first ratio, the first coefficient is a constant, and the first ratio is a ratio of the total number of addresses that need to be refreshed in the first entry to the number of addresses that can be refreshed a single time of the first entry.

In some possible implementations, a value of the first time is equal to a product of a first coefficient and a first sum, the first coefficient is a constant, the first sum is a first ratio plus one, and the first ratio is a ratio of the total number of addresses that need to be refreshed in the first entry to the number of addresses that can be refreshed a single time of the first entry.

In some possible implementations, a value of the second time is equal to a product of a second coefficient and a second ratio, the second coefficient is a constant, and the second ratio is a ratio of the total number of groups that need to be updated in the second entry to the number of groups that can be refreshed a single time.

In some possible implementations, a value of the second time is equal to a product of a second coefficient and a second sum, the second coefficient is a constant, the second sum is a second ratio plus one, and the second ratio is a ratio of the total number of groups that need to be updated in the second entry to the number of groups that can be refreshed a single time.

In some possible implementations, the controller comprises a processing unit, an L2P buffer, and a P2L buffer. The processing unit is configured to: acquire the first entry, and write the first entry to the P2L buffer; write the first mapping data to the P2L buffer according to the write instruction; write the storage data to the first physical block address according to the first mapping data; acquire the second entry, write the second entry to the L2P buffer, and write the second mapping data to the L2P buffer; and when the product of the first time and the second time is greater than or equal to the first value, update the second entry from the L2P buffer into the memory.

In some possible implementations, the first entry is greater than 16 Kb.

In a third aspect, examples of the present disclosure further provide a memory system. The memory system comprises a memory and a controller. The memory is coupled with the controller. The controller is configured to: acquire a first entry from the memory; write first mapping data to the first entry according to a write instruction, wherein the first mapping data is to indicate a mapping relationship of translation from a first physical block address into a first logical block address, the first physical block address is a storage address in a memory, and the first logical block address is a storage address recorded in the write instruction; write storage data to the first physical block address according to the first mapping data; acquire a second entry from the memory and write second mapping data to the second entry, wherein the second mapping data is to indicate a mapping relationship of translation from the first logical block address into the first physical block address; and when a product of first time and second time is greater than or equal to a first value, update the second entry into the memory, wherein the first time is theoretical time for refreshing mapping data in the first entry, and the second time is theoretical time for refreshing mapping data in the second entry.

In a fourth aspect, examples of the present disclosure further provide an electronic apparatus. The electronic apparatus comprises a processor and a memory system recorded in the above third aspect. The processor is coupled with the memory system.

In a fifth aspect, examples of the present disclosure further provide a computer readable storage medium. The computer readable storage medium comprises instructions. When running on the controller recorded in the above second aspect, the instructions make the controller perform the operation method of the controller recorded in the above first aspect. When running on the memory system recorded in the above third aspect, the instructions make the memory system perform the operation method of the controller recorded in the above first aspect. When running on the electronic apparatus recorded in the above fourth aspect, the instructions make the electronic apparatus perform the operation method of the controller recorded in the above first aspect.

It can be understood that, for the beneficial effects that can be achieved by the controller, the memory system, the electronic apparatus, and the computer readable storage medium provided by the above examples of the present disclosure, reference may be made to the beneficial effects of the operation method of the controller described above, which are no longer repeated herein.

BRIEF DESCRIPTION OF THE DRAWINGS

In order to illustrate the technical solution in the present disclosure more clearly, the drawings to be used in some examples of the present disclosure will be briefly introduced below. Apparently, the drawings in the following description are only drawings of some examples of the present disclosure. Those of ordinary skills in the art may also obtain other drawings according to these drawings. In addition, the drawings in the following description may be regarded as schematic diagrams, instead of limiting an actual size of a product, an actual flow of a method, an actual timing of a signal, etc. involved in the examples of the present disclosure.

DETAILED DESCRIPTION

The technical solutions in some examples of the present disclosure will be described below clearly and completely in conjunction with the drawings. Apparently, the examples described are only part of, but not all of, the examples of the present disclosure. All other examples obtained by those of ordinary skills in the art based on the examples provided by the present disclosure should fall in the scope of protection of the present disclosure.

Unless otherwise specified in the context, throughout the specification and the claims, the term "comprise" is interpreted as an open and inclusive meaning, i.e., "comprising, but not limited to". In the description of the specification, the terms "one implementation", "some implementations", "an example implementation", "in an example", or "some examples", etc. are intended to indicate that example features, structures, materials, or characteristics related to the example are comprised in at least one example of the present disclosure. The schematic representation of the above terms may not necessarily refer to the same implementation or example. Furthermore, these example features, structures, materials, or characteristics may be comprised in one or more implementation or examples in any suitable manner.

In the following, the terms "first" and "second" are only for the purpose of description, and cannot be construed as indicating or implying relative importance or implicitly indicating the number of indicated technical features. Thus, features defined by "first" and "second" may explicitly or implicitly comprise one or more of such features. In the description of the examples of the present disclosure, "a plurality of" means two or more, unless otherwise stated.

In describing some examples, the expressions "coupled" and "connected" and derivatives thereof may be used. For example, the term "connected" may be used in the description of some examples to indicate that two or more components have a direct physical contact or an electrical contact with each other. For another example, the term "coupled" may be used in the description of some examples to indicate that two or more components have a direct physical or electrical contact. However, the term "couple" may also mean that two or more components are not in direct contact with each other, but they still cooperate or interact with each other. The examples disclosed herein are not necessarily limited to the content herein.

"At least one of A, B and C" and "at least one of A, B or C" have the same meaning, both comprising the following combinations of A, B and C: A alone, B along, C alone, a combination of A and B, a combination of A and C, a combination of B and C, and a combination of A, B and C.

"A and/or B" comprises the following three combinations: A alone, B alone, and a combination of A and B.

The use of "suitable for" or "configured to" herein means open and inclusive language, and does not exclude an apparatus suitable for performing or configured to perform additional tasks or operations.

In addition, the use of "based on" means openness and inclusiveness, as processes, operations, calculations, or other actions "based on" one or more of the described conditions or values may be based on an additional condition or exceed the described value in practice.

Some basic concepts involved in examples of the present disclosure are first explained and described.

Sequential read and write, as the name implies, are to concentrate and line up data to be processed and perform continuous read and write according to an optimized speed, and generally can obtain a relatively ideal sequential read and write speed during read and write of a large file. Generally speaking, the sequential read and write refers to that a memory operates according to a time sequence of data in a process of reading and writing data, has a characteristic of read and write continuity, and is represented by a short read and write time, continuity, and large and concentrated read and write data in some examples. When a solid-state drive is used to watch a video or copy a video file with a size larger than tens of GBs, sequential read and write performance of the solid-state drive is brought into play. For a flash memory application product such as a solid-state drive, etc., one key parameter of the product is a sequential read and write speed (that is, a sequential read speed and a sequential write speed). A higher speed value represents better sequential read and write performance, a speed unit of a sequential read and write value is MB/s. The sequential read and write performance is critical to the copy of a large file.

Random read and write has a feature that read and write is random. Data is read and written without following a sequence of files. A file node may be jumped to arbitrarily to perform a read and write operation. After one solid-state drive has been used for a period of time, data has been written and deleted continuously previously. After use for certain time, naturally many scattered storage spaces are generated in flash memory particles of the solid-state drive or data storage addresses are not concentrated at a continuous space. In this case, a data read and write mode is not sequential read and write (continuous read and write). This read and write speed is generally lower, or even much lower, than the sequential read and write speed. Characteristics of random read and write are that read/written data is small and scattered, the randomness is strong, and a read and write time is long. Random read and write performance is a key indicator of the solid-state drive, and has a unit of read and write (input/output, I/O) operations per second (IOPS). When the random read and write performance is higher, processing of fragmentary file (for example, initialization program, virus scan, etc.) tasks is faster. Applications such as small file storage (for example, pictures), a mail server, an OLTP database, etc. are all cases in which random read and write are relatively frequent. To deal with such application scenarios, during selection of a solid-state drive, more attention is paid to the random read and write performance of the solid-state drive, and a key measurement indicator is IOPS.

Figure 1:
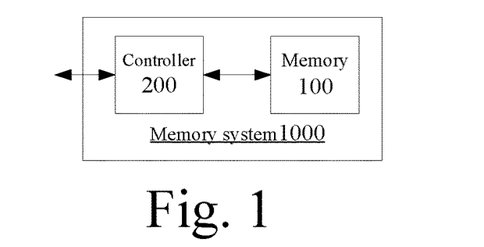
FIG. 1 is a schematic structural diagram one of a memory system according to some examples.
Figure 2:
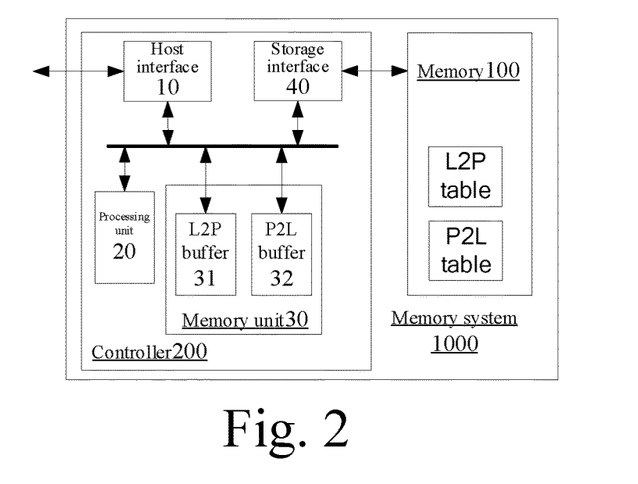
FIG. 2 is a schematic structural diagram of a controller according to some examples.

Examples of the present disclosure provide a memory system. As shown in FIG. 1, a memory system 1000 comprises a memory 100 and a controller 200. As shown in FIG. 2, the controller 200 comprises a host interface 10, a processing unit (processor) 20, a memory unit 30, and a storage interface 40. An L2P buffer 31 and a P2L buffer 32 are disposed in the memory unit 30. Coupling between the host interface 10, the processing unit 20, the L2P buffer 31, the P2L buffer 32, and the storage interface 40 is achieved through a data bus BUS1. The controller 200 is coupled with the memory 100 through the storage interface 40. The memory 100 is configured to store data. The controller 200 is configured to perform data processing on the memory 100. The controller 200 is configured to: receive, through the host interface 10, a data processing instruction sent by a host; and perform a data processing operation on the memory 100 according to the data processing instruction.

In an example of the present application, to ensure the security and reliability of data running, the host runs based on a logical block address (LBA). The memory 100 stores data based on a physical block address (PBA). When needing to perform data processing on the memory 100, the host needs to perform translation between a logical block address and a physical block address and perform a corresponding data processing operation, based on the assistance of the controller 200. To ensure the accuracy of each data processing operation to meet normal running of the host, a mapping table for a logical to physical translation, that is, an L2P table, needs to be established. A size of the L2P table is related to a storage space of the memory 100. An example in which a storage capacity of the memory 100 is 1 TB is used. The size of the L2P table may reach approximately 1 GB. Therefore, it is difficult for the memory unit 30 of the controller 200 to store a complete L2P table. Generally, the L2P table is stored in the memory 100. When performing data processing operations such as read, refresh, etc. on target data in the memory 100, address mapping data stored in the L2P table is required to complete positioning of the target data, to perform processing, etc. on the target data. A write data operation on the memory leads to update of mapping data in the L2P table. Therefore, during data processing on a storage space of a certain storage area in the memory, the controller needs to partially or completely read out the L2P table from the memory, change mapping data according to the write data operation, and update changed mapping data back to the L2P table of the memory 100. Update timing, update frequency, and update speed, etc. of the L2P table affect data processing performance of the memory system 1000. When the L2P table is updated quickly, a same entry part may be frequently written in or written out. When the L2P table is updated slowly, after storage data is written to a physical block address, a storage area of storage data, etc. may be changed before the L2P table is updated, which reduces the security and reliability of data.

In some possible implementations, as shown in FIG. 2, the controller 200 is configured to:

acquire a first entry from the memory 100, and store the first entry in the P2L buffer 32. The first entry is a partial or complete P2L table stored in the memory 100. The P2L table is configured to store mapping data of translation from a physical block address into a logical block address. The P2L table stored in the memory 100 may be configured to assist in restoring information of the L2P table, etc. A write instruction is inputted through the host interface 10. The write instruction is to instruct to perform data write processing on the first logical block address, to write storage data. A corresponding first physical block address is assigned according to the write instruction, and first mapping data is written to the first entry. The first mapping data is to indicate a mapping relationship of translation from the first physical block address into the first logical block address. The storage data is written to the first physical block address according to the recorded first mapping data, to complete the data write processing for the write instruction. After the data write processing is completed, it represents that data is written to a blank physical block address in the memory 100, or a physical block address of the storage data written to the memory 100 is changed, etc. In this case, mapping data in the L2P table is also changed. The L2P table needs to be updated. In some examples, an update mode is: writing second mapping data to a second entry in a P2L buffer 31 according to the first mapping data in the first entry, wherein the second mapping data is to indicate a mapping relationship of translation from the first logical block address into the first physical block address. When a certain update timing is reached, content recorded in the second entry is updated back to the L2P table stored in the memory 100, to complete the update of the L2P table.

In some possible implementations, the update timing may be determined according to a set certain threshold condition or determination condition, and an update operation is triggered to update changed mapping data back to the L2P table of the memory. In some examples, when the number of physical block addresses that needs to be updated in the P2L table reaches a certain number, the L2P table is updated according to the P2L table. In some examples, when a current invoked memory block is full, the L2P table is updated according to the P2L table.

Figure 3:
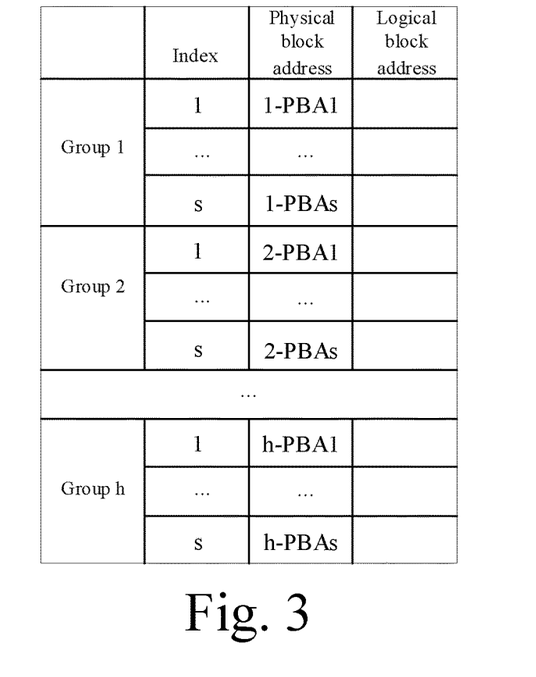
FIG. 3 is a schematic diagram of a first entry according to some examples.
Figure 4:
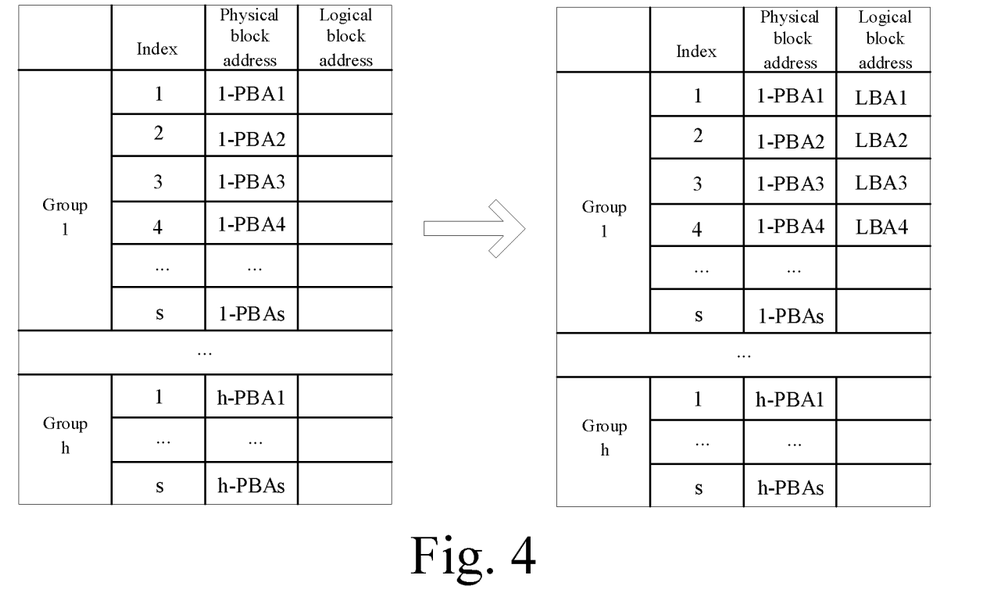
FIG. 4 is a schematic diagram of sequential write on a first entry according to some examples.
Figure 5:
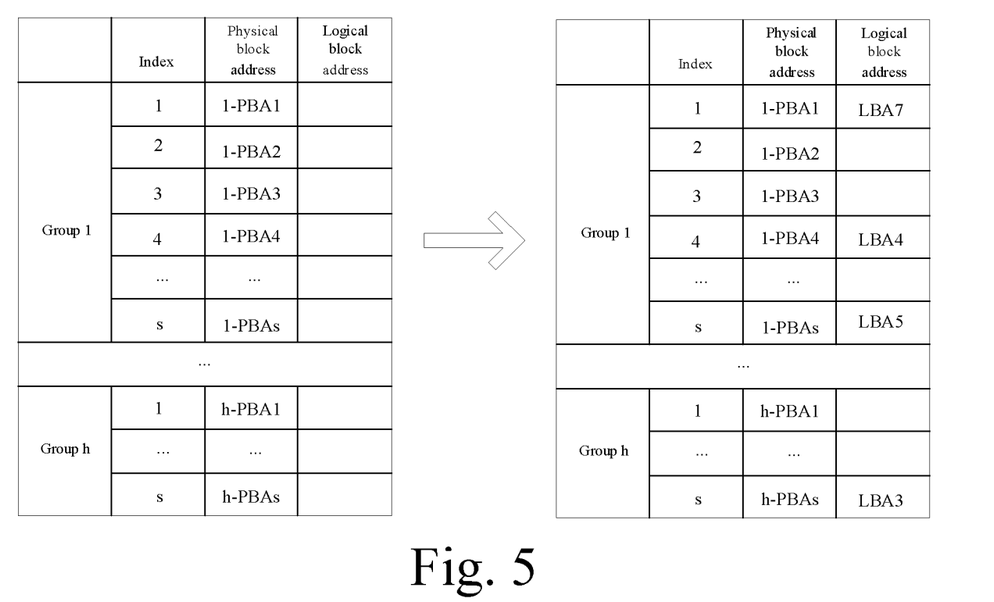
FIG. 5 is a schematic diagram of random write on a first entry according to some examples.

A write data operation may be a random write operation, or may be a sequential write operation, or may also be a combination of a random write operation and a sequential write operation. Therefore, in different write modes, the first mapping data is written to the first entry in the P2L buffer 32 in different manners, and cases of updating the L2P table according to the first mapping data are also different. As shown in FIG. 3, the P2L table may comprise a plurality of groups. Each group may comprise a plurality of pieces of first mapping data. Each piece of first mapping data represents one mapping relationship of translation from a physical block address into a logical block address. In a case of completely sequential write, as shown in FIG. 4, the controller 200 sequentially assigns physical block addresses to logical block addresses according to a receiving sequence of write instructions. In this case, in the P2L table, the first mapping data is sequentially recorded. That is, after one group becomes full, new first mapping data is written to a next group. Therefore, in a case of sequential write, first mapping data that needs to be updated is usually recorded in one or two groups. In a case of complete random write, as shown in FIG. 5, the controller 200 randomly assigns a physical block address to a logical block address according to a write instruction, and then corresponding first mapping data may be randomly written in different groups. In this case, the first mapping data that needs to be updated is usually located in a plurality of groups. The L2P table is updated with a group as a unit. When the update of the L2P table is triggered through a certain threshold condition or determination condition, in a case of random write, there are a large number of groups that need to be updated. As a result, update time of the L2P table is long, affecting the performance of the memory system 1000. If the number of groups that need to be updated is used as a determination condition for triggering an update, the update performance of the memory system 1000 in the case of sequential write is reduced. In addition to this, during actual application, the memory system 1000 generally combines random write and sequential write, and when corresponding to storage data in different application scenarios, data amounts of random write and sequential write are also not fixed. Therefore, when a fixed threshold condition or determination condition is used to trigger the update of the L2P table, processing flexibility is poor, it is difficult to achieve good performance in different write modes, and balance between update efficiency, update delay, and data security cannot be achieved. FIG. 3, FIG. 4, and FIG. 5 are schematic diagrams of processing the first entry corresponding to the P2L table. For an example of the second entry of the L2P table, reference may be made to the schematic diagrams of the first entry.

In some possible implementations, one dynamic condition is set in the present disclosure to determine the update timing of updating the L2P table. The dynamic condition is: determining whether a product of first time and second time is greater than or equal to a first value. The first time is theoretical time for refreshing mapping data in the first entry, and the second time is theoretical time for refreshing mapping data in the second entry. The controller 200 is configured to: when the dynamic condition is met, that is, when the product of the first time and the second time is greater than or equal to the first value, acquire the second entry from the L2P table of the memory 100, write the second mapping data to the second entry, and update the second entry into the L2P table of the memory 100. In an example of the present application, when a write mode is completely sequential write, the first mapping data in the first entry is also sequentially recorded. In this case, the first mapping data in the first entry is located in one or two groups, and then the second mapping data that needs to be updated in the second entry is also concentrated in one or two groups. A time of updating the L2P table may be considered equivalent to the first time required for refreshing the first entry. When the write mode is completely random write, the second mapping data that needs to be updated in the second entry is located in a plurality of different groups, and the time of updating the L2P table is the second time for refreshing all groups in the second entry. The above-mentioned dynamic condition is obtained according to the first time and the second time. In different application scenarios, randomly written storage data and sequentially written storage data have different data amounts, and then triggering timing of the dynamic condition is also dynamically matched. The flexibility of triggering update of the L2P table can be improved according to the above-mentioned dynamic condition. In a case of complete random write, a case of completely sequential write, and a case of mix-using sequential write and random write, good update efficiency can be achieved, so that it is avoided that high update efficiency, low update latency, and security and reliability of updating data cannot be ensured for the update of the L2P table in different write modes under a single threshold condition or determination condition.

In some examples, the first entry is greater than 16 Kb. In some examples, a storage space of the P2L buffer 32 is greater than 96 Kb. In an example of the present application, when the first entry and the P2L buffer 32 are larger, an example of the present application has better implementation effect. Therefore, in the design of the memory system 1000, the space of the P2L buffer 32 may be made larger. However, an example of the present application should not be considered as a limitation to this solution. In a case that the first entry is less than or equal to 16 Kb, this solution can also be achieved.

Figure 6:
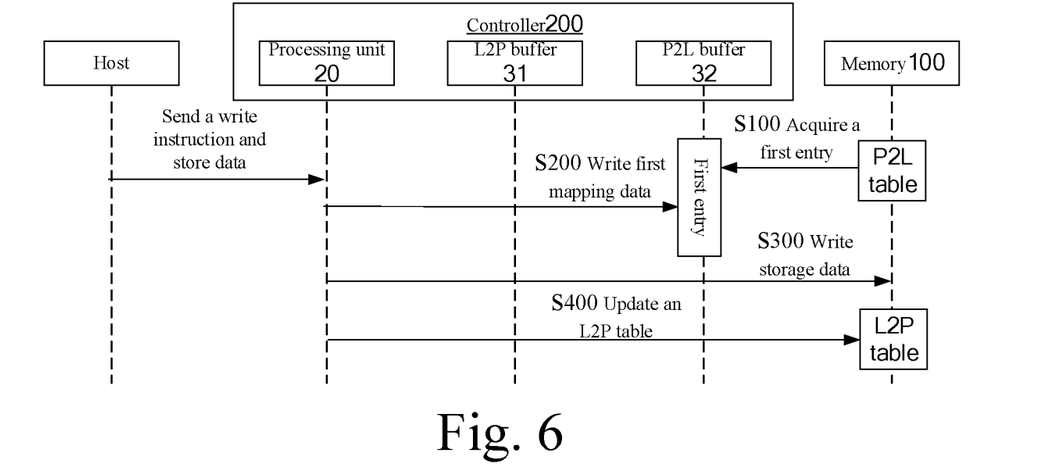
FIG. 6 is a schematic flowchart one of an operation method of a processor according to some examples.

Based on the controller that comprises the above structure in FIG. 2, an operation method that is shown in FIG. 6 below and comprises operations S100-S400 may be performed.

S100: Acquire a first entry from the memory 100.

In an example of the present application, as shown in FIG. 2, the controller 200 acquires related entry content of the P2L table from the memory 100 through the storage interface 40 to obtain the first entry, and stores the first entry in the P2L buffer 32. The first entry may be complete or partial entry content of the P2L table. In subsequent operations, the controller 200 may perform a related data processing operation according to a physical block address recorded in the first entry.

S200: Write first mapping data to the first entry according to a write instruction.

In some possible implementations, the first mapping data is to indicate a mapping relationship of translation from a first physical block address into a first logical block address, the first physical block address is a storage address in the memory 100, and the first logical block address is a storage address recorded in the write instruction. In an example of the present application, the host operates based on a logical block address. Similarly, the write instruction outputted by the host is to instruct to write storage data to the first logical block address. The controller 200 assigns the first physical block address recorded in the first entry to the first logical block address according to the write instruction, to obtain the first mapping data. The first mapping data indicates the mapping relationship of translation from the first physical block address into the first logical block address, and the first mapping data is written to the first entry.

S300: Write storage data to the first physical block address according to the first mapping data.

In an example of the present application, after assigning the first physical block address to the first logical block address, the controller 200 obtains the first mapping data.

Subsequently, the controller 200 may write storage data to the assigned first physical block address based on the first mapping data, to perform the write instruction.

In some examples, the controller 200 may receive a write response completion signal. In an example of the present application, after the write instruction is performed on the first physical block address in the memory 100, after completing a write operation of storage data, the memory 100 sends the write response completion signal to the controller 200. The controller 200 determines, according to the write response completion signal, that the write instruction is completed.

In some possible implementations, an interval time between the above operations S200 and S300 is short during actual application. In some application scenarios, operations S200 and S300 also may be considered as one operation performed simultaneously.

S400: Update the L2P table.

Figure 7:
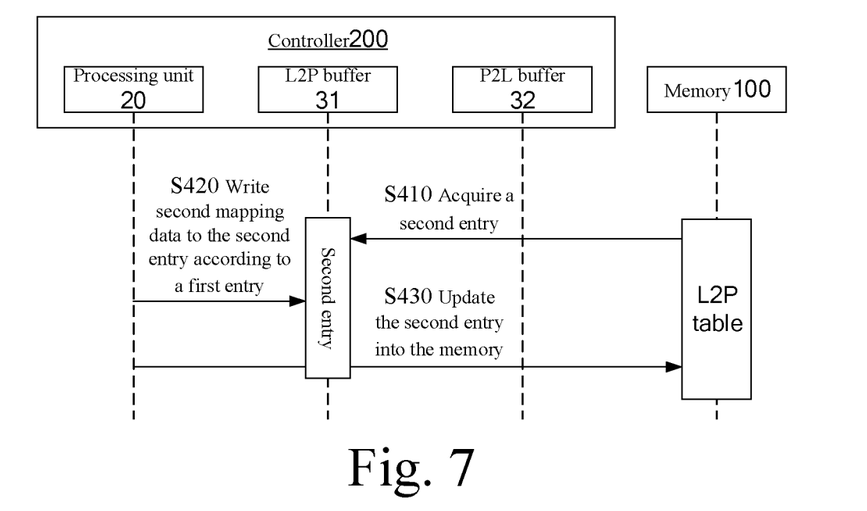
FIG. 7 is a schematic flowchart two of an operation method of a processor according to some examples.

In some possible implementations, as shown in FIG. 7, operation S400 may comprise the following operations S410-S430.

S410: Acquire a second entry from the memory 100.

In an example of the present application, the second entry corresponding to the L2P table is acquired from the memory 100 according to the first entry corresponding to the P2L table.

S420: Write the second mapping data to the second entry according to the first entry.

In an example of the present application, after the write response completion signal is received, it is determined that the write instruction is completed, and the second mapping data may be written to the second entry according to the first mapping data recorded in the first entry. The second mapping data is to indicate a mapping relationship of translation from the first logical block address into the first physical block address.

S430: Update the second entry into the memory 100.

In some possible implementations, when the dynamic condition is met, the second entry is updated into the L2P table of the memory 100. The dynamic condition is that the product of the first time and the second time is greater than or equal to the first value. The first time is theoretical time for refreshing mapping data in the first entry, and the second time is theoretical time for refreshing mapping data in the second entry.

In some examples, the above operations S410-S430 may start to be performed when the dynamic condition is met. In some examples, operations S410 and S420 may also be performed first before the dynamic condition is met, and operation S430 is performed after the dynamic condition is met.

In an example of the present application, when a write mode is completely sequential write, the first mapping data in the first entry is also sequentially recorded. In this case, the first mapping data in the first entry is located in one or two groups, and the second mapping data that needs to be updated in the second entry is also concentrated in one or two groups. A time of updating the L2P table may be considered equivalent to the first time required for refreshing the first entry. When the write mode is completely random write, the second mapping data that needs to be updated in the second entry is located in a plurality of different groups, and then the time of updating the L2P table is the second time for refreshing all groups in the second entry. The above-mentioned dynamic condition is obtained according to the first time and the second time. In different application scenarios, randomly written storage data and sequentially written storage data have different data amounts, and triggering timing of the dynamic condition is also dynamically matched. The flexibility of triggering update of the L2P table can be improved according to the above-mentioned dynamic condition. In a case of complete random write, a case of completely sequential write, and a case of mix-using sequential write and random write, good update efficiency can be achieved, so that it is avoided that high update efficiency, low update latency, and security and reliability of updating data cannot be ensured for the update of the L2P table in different write modes under a single threshold condition or determination condition.

In some possible implementations, a value of the first time is equal to a product of a first coefficient and a first ratio, the first coefficient is a constant, and the first ratio is a ratio of the total number of addresses that need to be refreshed in the first entry to the number of addresses that can be refreshed a single time of the first entry.

In an example, the first time is $T1=k*([Y/m])$. In the formula, k is the first coefficient, the first coefficient is a constant, and a value of the first coefficient is related to device parameters of the memory 100. For example, the first coefficient is a constant set according to an FTL and a hardware accelerator, and represents time of an operation of refreshing a round of addresses in the first entry a single time. Y is a size of the first entry, that is, a total size of address data of P2L. m is a size of address data refreshed a single time of the first entry. In an example of the present application, when sequential write is completely used, the first entry records a mapping relationship between a physical block address and a logical block address according to an address sequence. In this case, address data in the first entry is concentrated in one or two groups. Only one or two groups need to be updated. In the second entry, data that needs to be updated is also concentrated in one or two groups. Therefore, in the case of completely sequential write, a time of updating the second entry may be approximately considered as refresh time of all addresses that need to be updated, that is, a total refresh time of addresses recorded in the first entry. A total update round speed of addresses of the first entry is the total number of addresses divided by the number of addresses that can be updated a single time, that is, Y/m. Update time of each round is k. k is a time determined according to actual hardware parameters. Therefore, the first time T1 is a total round speed (that is, the first ratio) multiplied by the update time (that is, the first coefficient) of a single round.

In some possible implementations, a value of the first time is equal to a product of a first coefficient and a first sum, the first coefficient is a constant, the first sum is a first ratio plus one, and the first ratio is a ratio of the total number of addresses that need to be refreshed in the first entry to the number of addresses that can be refreshed a single time of the first entry.

In an example, the first time $T1=k*([Y/m]+1)$. In an example of the present application, during actual application, the calculated total round speed (that is, the first ratio) may be a value with a decimal. Therefore, in computational processing of a chip, the decimal may be rounded (for example, the decimal is neglected and taken as 0, or, the decimal is rounded to 1). During actual application, if a value of a decimal is calculated during each time of determination, etc., a calculation amount is greatly increased, and the processing performance of the memory system 1000 is reduced. Therefore, during the calculation of the first ratio, a decimal part may be generally ignored, the first ratio is generally added by one, and an obtained total round speed is the first ratio plus one round, and is then multiplied by refresh time k of a single round to obtain the first time T1. In this manner, the calculation of a decimal part is avoided.

In some possible implementations, a value of the second time is equal to a product of a second coefficient and a second ratio, the second coefficient is a constant, and the second ratio is a ratio of the total number of groups that need to be updated in the second entry to the number of groups that can be refreshed a single time.

In an example, the second time is T2=p ([X/n]). In the formula, p is the second coefficient, the second coefficient is a constant, and a value of the second coefficient is related to device parameters of the memory 100. For example, the first coefficient is a constant set according to an FTL and a hardware accelerator, and represents a time of an operation of refreshing a round of groups in the second entry a single time. X is the number of groups that need to be updated in the second entry, and n is the number of groups that can be refreshed in a single round. In an example of the present application, when random write is completely used, there are a large number of groups in the second entry. The L2P table is updated with a group as a unit. Therefore, in this case, the second ratio (that is, the total number of groups that need to be refreshed divided by the number of groups that can be refreshed a single time) represents a required round speed of refreshing, and the second coefficient represents a time required for a single round of refreshing. The product of the second ratio and the second coefficient is the second time T2.

In some possible implementations, a value of the second time is equal to a product of a second coefficient and a second sum, the second coefficient is a constant, the second sum is a second ratio plus one, and the second ratio is a ratio of the total number of groups that need to be updated in the second entry to the number of groups that can be refreshed a single time.

In an example, the second time is T2=p([X/n]+1). In an example of the present application, the operation of a decimal part can be reduced. For the technical principle and technical effect in an example of the present application, reference may be made to the related description in the example of the foregoing first time T1. Details are not described herein again.

In an example, the dynamic condition may be represented as:

$$T1 * T2 = k * ([Y/m] + 1) * p([X/n] + 1) \geq \text{the first value?}$$

When the above-mentioned dynamic condition is met, the update of the L2P table is triggered.

In an example, the above-mentioned dynamic condition may be simplified as:

$$([Y/m] + 1)([X/n] + 1) \geq \text{threshold?}$$

In the formula, the threshold=(the first value/k*p).

In some examples, a value range of the threshold may be [3, 6]. Because the threshold=(the first value/k*p), the first value is [3k*p, 6k*p]. k is the time required for refreshing physical block addresses in the first entry a single time, and p is the time required for refreshing groups in the second entry a single time.

Figure 8:
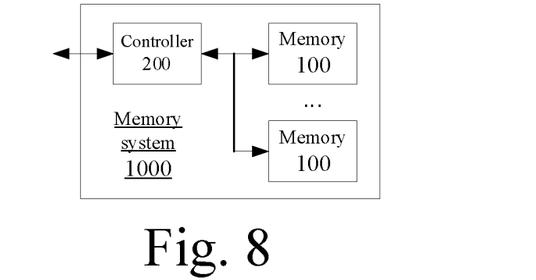
FIG. 8 is a schematic structural diagram two of a memory system according to some examples.

Examples of the present disclosure further provide a memory system 1000, as shown in FIG. 1 and FIG. 8. FIG. 1 is a block diagram of the memory system 1000 according to the above example. FIG. 8 is a block diagram of a memory system according to some other examples. Based on the above example shown in FIG. 1, each of the first entry and the second entry corresponds to one memory 100. In the example shown in FIG. 8, different memories 100 store corresponding L2P tables and P2L tables. During actual application, the first entry and the second entry need to be obtained according to the L2P table and the P2L table of the corresponding memory 100, to update the L2P table of the corresponding memory 100. For the description of the related technical principle and technical effect of updating the L2P table in the example shown in FIG. 8, reference may be made to the foregoing related description in FIG. 1-FIG. 7. Details are not described herein again.

The memory system 1000 may be integrated in various types of storage apparatuses, for example, be comprised in the same package, such as a Universal Flash Storage (UFS) package or an Embedded Multi Media Card (eMMC) package. That is, the memory system 1000 may be applied to and packaged into various types of electronic products, for example, a mobile phone (e.g. a cellphone), a desktop computer, a tablet computer, a notebook computer, a server, a vehicle apparatus, a gaming console, a printer, a pointing apparatus, a wearable apparatus, a smart sensor, a mobile power supply, a virtual reality (VR) apparatus, an augmented reality (AR) apparatus, or any other suitable electronic apparatuses having storages therein.

In some examples, referring to FIG. 1, the memory system 1000 comprises a controller 200 and a memory 100. The memory system 1000 may be integrated into a memory card.

The memory card comprises any one of a PC (PCMCIA, Personal Computer Memory Card International Association) card, a Compact Flash (CF) card, a Smart Media (SM) card, a memory stick, a Multimedia Card (MMC), a Secure Digital Memory Card (SD) card, and a UFS.

In some other examples, referring to FIG. 8, the memory system 1000 comprises a controller 200 and a plurality of memories 100. The memory system 1000 is integrated into a solid-state drive (SSD).

In the memory system 1000, in some examples, the controller 200 is configured for operating in a low duty-cycle environment, such as Secure Digital (SD) cards, Compact Flash (CF) cards, Universal Serial Bus (USB) flash drives, or other media for use in electronic apparatuses, such as personal computers, digital cameras, mobile phones, etc.

In some other examples, the controller 200 is configured for operating in high duty-cycle environment SSDs or eMMCs used as data storages for mobile apparatuses, such as smartphones, tablet computers, notebook computers, etc., and enterprise memory arrays.

In some examples, the controller 200 may be configured to manage the data stored in the memories 100 and communicate with an external apparatus (e.g., a host). In some examples, the controller 200 may be further configured to control operations of the memories 100, such as reading, erasing, and programming operations. In some examples, the controller 200 may be further configured to manage various functions with respect to data stored or to be stored in the memories 100, comprising at least one of bad-block management, garbage collection, logical to physical translation, and wear leveling. In some examples, the controller 200 is further configured to process error correction codes with respect to the data read from or written to the memories 100.

Of course, the controller 200 may also perform any other suitable functions, such as formatting the memories 100. For example, the controller 200 may communicate with an external apparatus (e.g., a host) through at least one of various interface protocols.

It is to be noted that the host interface 10 and the storage interface 40 achieve data exchange and communication based on an interface protocol. The interface protocols comprise at least one of a USB protocol, an MMC protocol, a Peripheral Component Interconnection (PCI) protocol, a PCI-Express (PCI-E) protocol, an Advanced Technology Attachment (ATA) protocol, a Serial-ATA protocol, a Parallel-ATA protocol, a Small Computer Small Interface (SCSI) protocol, an Enhanced Small Disk Interface (ESDI) protocol, an Integrated Drive Electronics (IDE) protocol and a Firewire protocol.

Some examples of the present disclosure further provide an electronic apparatus. The electronic apparatus may be any one of a cellphone, a desktop computer, a tablet computer, a notebook computer, a server, a vehicle apparatus, a wearable apparatus (e.g., a smart watch, a smart bracelet, and smart glasses, etc.), a mobile power supply, a gaming machine, a digital multimedia player, etc.

Figure 9:
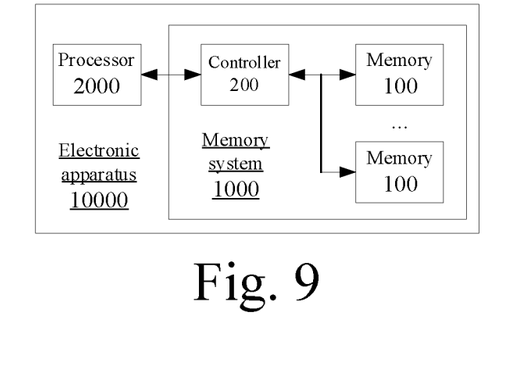
FIG. 9 is a schematic structural diagram of an electronic apparatus according to some examples.

As shown in FIG. 9, an electronic apparatus 10000 may comprise the above memory system 1000, and may further comprise at least one of the processor 2000, a cache, etc.

In an example, the processor 2000 may be a processor of a host.

In an example, the processor 2000 may be a chip, and in some examples, may be a field programmable gate array (FPGA), or may be application specific integrated circuit (ASIC), or may further be a system on chip (SoC), or may be a central processing unit (CPU), or may further be a network processor (NP), or may further be a digital signal processor (DSP), or may further be a micro controller unit (MCU), or may further be a programmable logic device (PLD) or another integrated chip.

Examples of the present disclosure further provide a computer readable storage medium. The computer readable storage medium comprises instructions. When running on the controller 200 recorded in the above example, the instructions make the controller 200 perform the operation method of the controller 200 recorded in the above example. When running on the memory system 1000 recorded in the above example, the instructions make the memory system 1000 perform the operation method of the controller 200 recorded in the above example. When running on the electronic apparatus 10000 recorded in the above example, the instructions make the electronic apparatus 10000 perform the operation method of the controller 200 recorded in the above example.

The above descriptions are merely example implementations of the present disclosure, and the protection scope of the present disclosure is not limited to these. Any variation or replacement that may be readily figured out by those skilled in the art within the technical scope disclosed by the present disclosure shall be encompassed within the protection scope of the present disclosure. Therefore, the scope of protection of the present disclosure should be defined by the scope of protection of the claims.

What is claimed is:

1. An operation method of a controller, comprising:
   acquiring a first entry;
   writing first mapping data to the first entry according to a write instruction, wherein the first mapping data is to indicate a mapping relationship of translation from a first physical block address into a first logical block address, the first physical block address is a storage address in a memory, and the first logical block address is a storage address recorded in the write instruction;
   writing storage data to the first physical block address according to the first mapping data;
   acquiring a second entry;
   writing second mapping data to the second entry, wherein the second mapping data is to indicate a mapping relationship of translation from the first logical block address into the first physical block address; and
   in response to that a product of first time and second time is greater than or equal to a first value, updating the second entry into the memory, wherein the first time is theoretical time for refreshing mapping data in the first entry, and the second time is theoretical time for refreshing mapping data in the second entry.

2. The operation method of the controller of claim 1, wherein a value of the first time is equal to a product of a first coefficient and a first ratio, the first coefficient is a constant, and the first ratio is a ratio of a total number of addresses that need to be refreshed in the first entry to the number of addresses that are able be refreshed a single time of the first entry.

3. The operation method of the controller of claim 1, wherein a value of the first time is equal to a product of a first coefficient and a first sum, the first coefficient is a constant, the first sum is a first ratio plus one, and the first ratio is a ratio of a total number of addresses that need to be refreshed in the first entry to the number of addresses that are able to be refreshed a single time of the first entry.

4. The operation method of the controller of claim 1, wherein a value of the second time is equal to a product of a second coefficient and a second ratio, the second coefficient is a constant, and the second ratio is a ratio of the total number of groups that need to be updated in the second entry to the number of groups that are able to be refreshed a single time.

5. The operation method of the controller of claim 1, wherein a value of the second time is equal to a product of a second coefficient and a second sum, the second coefficient is a constant, the second sum is a second ratio plus one, and the second ratio is a ratio of the total number of groups that need to be updated in the second entry to the number of groups that are able to be refreshed a single time.

6. The operation method of the controller of claim 1, wherein the first entry is greater than 16 Kb.

7. A controller, configured to:
   acquire a first entry;
   write first mapping data to the first entry according to a write instruction, wherein the first mapping data is to indicate a mapping relationship of translation from a first physical block address into a first logical block address, the first physical block address is a storage address in a memory, and the first logical block address is a storage address recorded in the write instruction;
   write storage data to the first physical block address according to the first mapping data;
   acquire a second entry;
   write second mapping data to the second entry, wherein the second mapping data is to indicate a mapping relationship of translation from the first logical block address into the first physical block address; and
   in response to that a product of first time and second time is greater than or equal to a first value, updating the second entry into the memory, wherein the first time is theoretical time for refreshing mapping data in the first entry, and the second time is theoretical time for refreshing mapping data in the second entry.

8. The controller of claim 7, wherein a value of the first time is equal to a product of a first coefficient and a first ratio, the first coefficient is a constant, and the first ratio is a ratio of the total number of addresses that need to be refreshed in the first entry to the number of addresses that are able to be refreshed a single time of the first entry.

9. The controller of claim 7, wherein a value of the first time is equal to a product of a first coefficient and a first sum, the first coefficient is a constant, the first sum is a first ratio plus one, and the first ratio is a ratio of the total number of addresses that need to be refreshed in the first entry to the number of addresses that are able to be refreshed a single time of the first entry.

10. The controller of claim 7, wherein a value of the second time is equal to a product of a second coefficient and a second ratio, the second coefficient is a constant, and the second ratio is a ratio of the total number of groups that need to be updated in the second entry to the number of groups that are able to be refreshed a single time.

11. The controller of claim 7, wherein a value of the second time is equal to a product of a second coefficient and a second sum, the second coefficient is a constant, the second sum is a second ratio plus one, and the second ratio is a ratio of the total number of groups that need to be updated in the second entry to the number of groups that are able to be refreshed a single time.

12. The controller of claim 7, wherein the controller comprises at least one processor, an L2P buffer, and a P2L buffer, and
wherein the at least one processor is configured to:
acquire the first entry;
write the first entry to the P2L buffer;
write the first mapping data to the P2L buffer according to the write instruction;
write the storage data to the first physical block address according to the first mapping data;
acquire the second entry;
write the second entry to the L2P buffer, and write the second mapping data to the L2P buffer; and
in response to that the product of the first time and the second time is greater than or equal to the first value, update the second entry from the L2P buffer into the memory.

13. The controller of claim 7, wherein the first entry is greater than 16 Kb.

14. A memory system, comprising:
a memory coupled with a controller; and
the controller configured to:
acquire a first entry from the memory;
write first mapping data to the first entry according to a write instruction, wherein the first mapping data is to indicate a mapping relationship of translation from a first physical block address into a first logical block address, the first physical block address is a storage address in the memory, and the first logical block address is a storage address recorded in the write instruction;
write storage data to the first physical block address according to the first mapping data;
acquire a second entry from the memory;
write second mapping data to the second entry, wherein the second mapping data is to indicate a mapping relationship of translation from the first logical block address into the first physical block address; and
in response to that a product of first time and second time is greater than or equal to a first value, update the second entry into the memory, wherein the first time is theoretical time for refreshing mapping data in the first entry, and the second time is theoretical time for refreshing mapping data in the second entry.

15. The memory system of claim 14, wherein a value of the first time is equal to a product of a first coefficient and a first ratio, the first coefficient is a constant, and the first ratio is a ratio of the total number of addresses that need to be refreshed in the first entry to the number of addresses that are able to be refreshed a single time of the first entry.

16. The memory system of claim 14, wherein a value of the first time is equal to a product of a first coefficient and a first sum, the first coefficient is a constant, the first sum is a first ratio plus one, and the first ratio is a ratio of the total number of addresses that need to be refreshed in the first entry to the number of addresses that are able to be refreshed a single time of the first entry.

17. The memory system of claim 14, wherein a value of the second time is equal to a product of a second coefficient and a second ratio, the second coefficient is a constant, and the second ratio is a ratio of the total number of groups that need to be updated in the second entry to the number of groups that are able to be refreshed a single time.

18. The memory system of claim 14, wherein a value of the second time is equal to a product of a second coefficient and a second sum, the second coefficient is a constant, the second sum is a second ratio plus one, and the second ratio is a ratio of the total number of groups that need to be updated in the second entry to the number of groups that are able to be refreshed a single time.

19. The memory system of claim 14, wherein the controller comprises at least one processor, an L2P buffer, and a P2L buffer, and
wherein the at least one processor is configured to:
acquire the first entry;
write the first entry to the P2L buffer;
write the first mapping data to the P2L buffer according to the write instruction;
write the storage data to the first physical block address according to the first mapping data;
acquire the second entry;
write the second entry to the L2P buffer, and write the second mapping data to the L2P buffer; and
in response to that the product of the first time and the second time is greater than or equal to the first value, update the second entry from the L2P buffer into the memory.

20. The memory system of claim 14, wherein the first entry is greater than 16 Kb.

* * * * *